United States Patent
Holland et al.

[11] Patent Number: 5,337,229
[45] Date of Patent: Aug. 9, 1994

[54] SHARED INTERFACE FOR MULTIPLE CONTROLLERS

[75] Inventors: Scott B. Holland, Shelby Township, Macomb County; Kenneth L. Fair, Lake Orion; James P. Youells, Mt. Clemens, all of Mich.

[73] Assignee: Balance Engineering Corporation, Troy, Mich.

[21] Appl. No.: 892,197

[22] Filed: Jun. 2, 1992

[51] Int. Cl.$^5$ .................. G06F 13/10; G06F 15/20
[52] U.S. Cl. ................... 364/131; 364/463; 364/132; 364/138; 345/115
[58] Field of Search ............ 364/463, 131–140; 395/162, 163, 275, 575; 358/181; 340/721; 345/115, 116

[56] References Cited

U.S. PATENT DOCUMENTS

| | | | |
|---|---|---|---|
| 4,032,897 | 6/1977 | Pooley | 364/900 |
| 4,285,240 | 8/1981 | Gold | 364/463 X |
| 4,511,965 | 4/1985 | Rajaram | 345/115 X |
| 4,647,928 | 3/1987 | Casey | 364/463 X |
| 4,757,441 | 7/1988 | Buckland et al. | 364/200 |
| 4,942,391 | 7/1990 | Kikuta | 345/115 X |
| 4,977,510 | 12/1990 | Winzenz et al. | 364/463 |

Primary Examiner—Jerry Smith
Assistant Examiner—Brian C. Oakes
Attorney, Agent, or Firm—Donald J. Breh; Davis Chin

[57] ABSTRACT

A control system for a balancing machine has a main computer with a keypad and monitor, an auxiliary computer for managing the balance measurement and correction functions and sharing the same keypad and monitor. Each computer controls the machine through a programmable logic controller (PLC). A video sharing circuit allows direct coupling of each computer to the monitor and includes a switching function under control of the main computer via the PLC to determine which computer will control the monitor display. A dedicated key command on the keypad controls the switching of the monitor control. Software in each computer responds to the dedicated key command for monitor control and also enables response to all other keypad commands by the computer which currently controls the monitor.

3 Claims, 3 Drawing Sheets

SHARED INTERFACE FOR MULTIPLE CONTROLLERS

FIELD OF THE INVENTION

This invention relates to controllers and particularly to a machine or process controller having multiple computers sharing a keypad and a video monitor.

BACKGROUND OF THE INVENTION

It is commonplace for a computer, equipped with a keypad and a monitor, to control the operation of a machine or a process. Usually a programmable logic controller (PLC), also containing a computer under control of the first computer, is used to provide the control signals to the apparatus being controlled. In the case of specialized operations or those involving complex calculations, an auxiliary computer is used for those functions. To avoid extra peripheral equipment in the system it is desirable that the auxiliary computer use the same monitor and keypad as the first computer, even though the computers may not necessarily employ the same communication protocols or signal formats. An example of such a system is a balancing machine.

FIG. 1 shows a typical block diagram for a prior art balancing machine control using a video display based man-machine interface (MMI) 10, a programmable logic controller (PLC) 12 and an auxiliary computer or processor such as a computerized balancing instrument (CBI) 14. The MMI 10 consists of a keypad 16 for entering data, a central processing unit (CPU) 18 and a video monitor 20 for displaying data. An RS-232 serial data link 22 couples the keypad 16 to the CPU 18 and a video line 24 connects the CPU 18 video output to the monitor 20. Another RS-232 link 26 transmits data between the CPU 18 and the PLC 12 and yet another RS-232 data link 28 transmits data between the CBI 14 and the PLC 12. The balancing machine 30 is under control of the PLC 12 via input/output coupling 32.

In operation, when a key is pressed on the operator keypad 16, an RS-232 signal is transmitted to the CPU 18. The MMI program in the CPU receives this signal and decides which function the pressed key is requesting. If the key pressed calls for some action of the part of the PLC 12, the CPU will transmit a command to the PLC via the signal link 26 using a communications format which is normally unique to the manufacturer of the PLC 12. The PLC will then execute the requested command. If that command involves the transmission of data or commands to the CBI 14, the PLC will transmit the information over the data link 28 using the same communications format as used between the PLC and the CPU. This scheme requires the programmer of the CBI to write communications software using many different formats in order to support equipment made by a variety of PLC manufacturers.

If the CBI needs to display data on the monitor 20, it must first be transmitted to the PLC 12 via the RS-232 link 28, from there it is transmitted to the CPU 18 which displays it on the monitor. Since the data to be displayed passes through two computer systems, each busy with other tasks, a significant time delay is experienced between the time the data is available at the CBI and the time that it appears of the monitor. Similarly, input commands to the CBI 14 entered through the keypad 16 also have to pass through the two computer systems of the CPU and the PLC to reach the CBI and therefore suffer similar delays.

SUMMARY OF THE INVENTION

It is therefore an object of the invention to provide in a controller system with multiple processors and a single monitor, a monitor sharing system which allows direct data transmission from either processor to the monitor. It is another object to provide in such a system a direct link from a single keypad to the processors.

The invention is carried out in a computerized control system having at least two processors, by an arrangement for sharing a monitor comprising: a man-machine interface comprising a keypad, a monitor and a first processor; a second processor; a data link for coupling the keypad to the first and the second processors; each processor having a video output for issuing respective video signals; switch means under control of one of the processors and connected to both video outputs and to the monitor input for selectively coupling the video signals to the monitor; and the said one processor being programmed to respond to a switching keypad command to effect coupling of a selected processor to the monitor and to place the selected processor under keypad control, whereby the processor which is immediately controlled by the keypad controls a display on the monitor.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

While the ensuing description is directed to a control system for a balancing machine having a special balancing computer, it is expected that the invention applies as well to other controllers having a shared monitor and/or keyboard for two or more computers. The computers are microprocessor based machines and are sometimes referred to herein as "processors".

Figure 1:
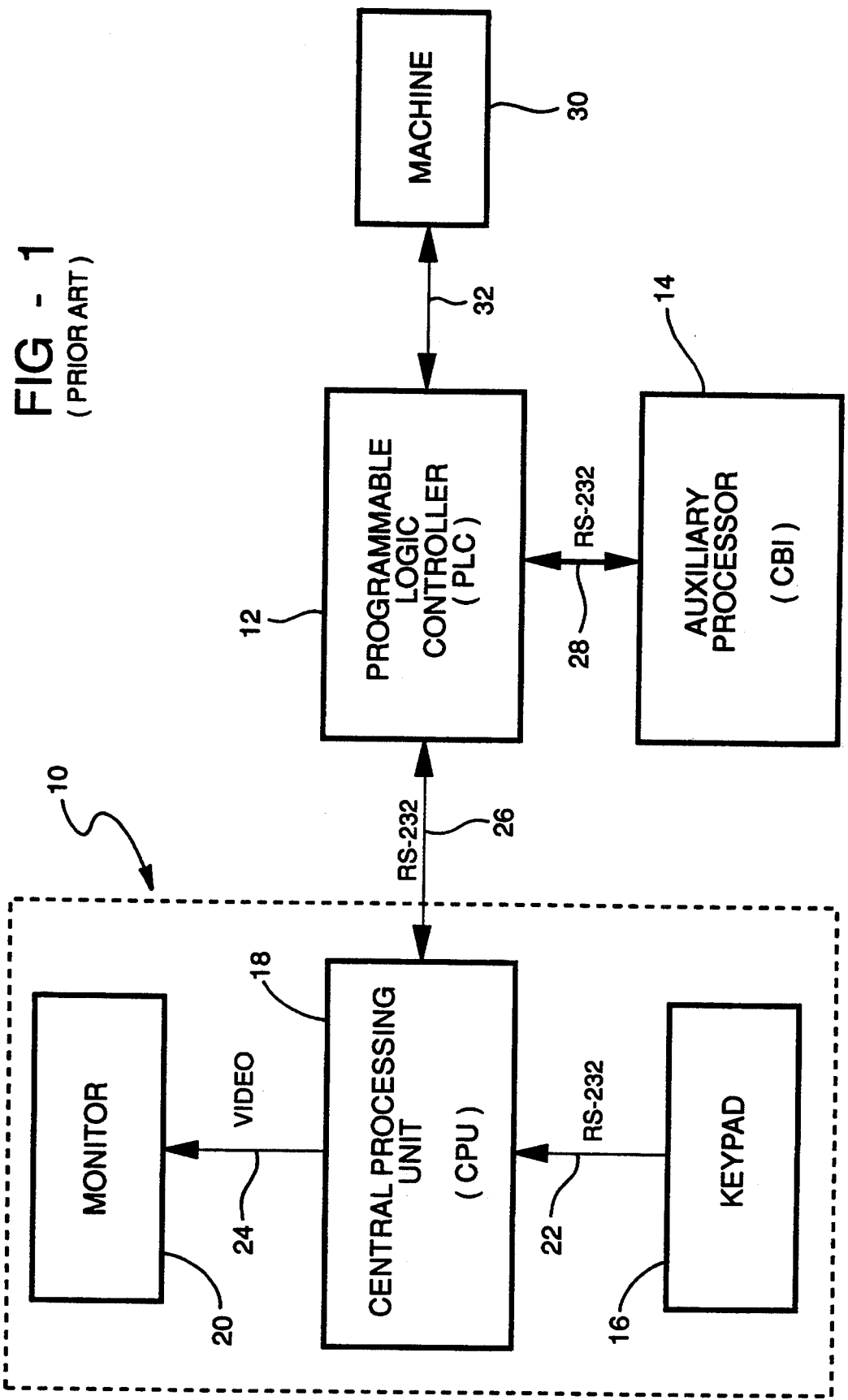
FIG. 1 is a block diagram of a prior art machine control system having two processors sharing a single monitor.
Figure 2:
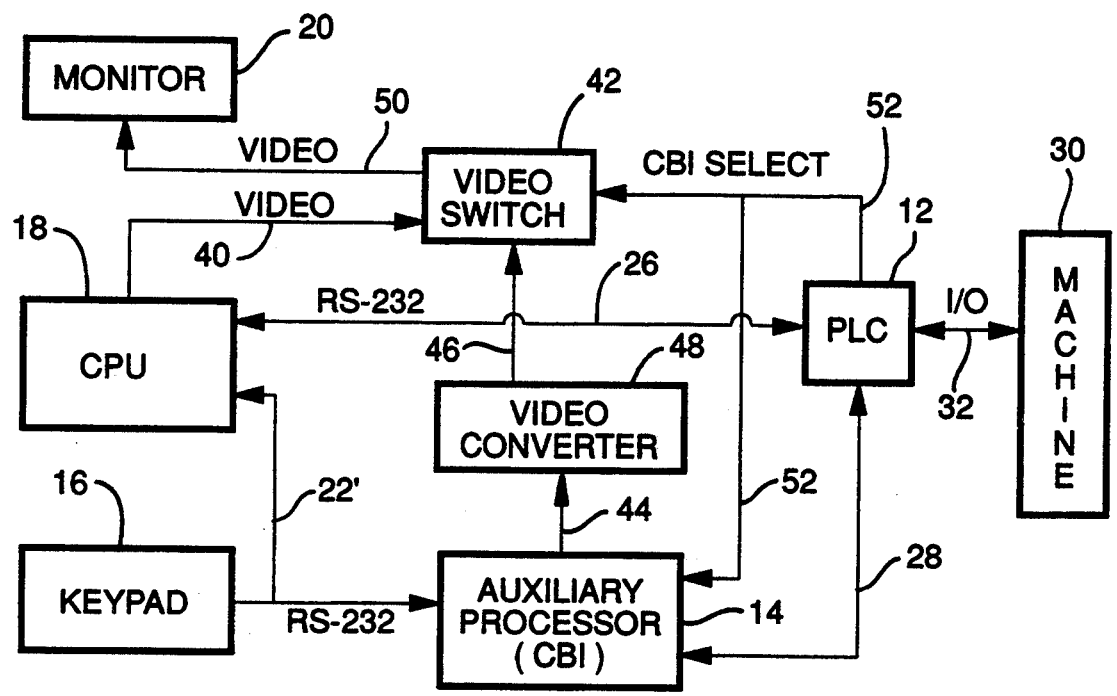
FIG. 2 is a block diagram of a control machine control system having two processors sharing a single monitor according to the invention.

Referring to FIG. 2, the improved controller system employs the components of FIG. 1 and adds some special circuitry for providing a direct video path from the auxiliary processor or CBI 14 to the monitor 20, and some software is provided for each processor for managing the sharing of the monitor and the keypad. In addition, video conversion capability is incorporated in case the video format of the monitor 20 is not compatible with the video output of the CBI processor 14. It is assumed that the video output of the CPU 18 is compatible with the monitor 20 since those components, along with the keypad 16 are generally purchased as a unit.

Here the keypad 16 is coupled by an RS-232 serial data link 22' to both the CPU 18 and the CBI 14, thereby allowing rapid key input to the CBI without the time lags encountered in the prior configuration. The video output of the CPU 18 is carried by line 40 to a first input of a video switch 42, and the video output of the CBI 14 is coupled by lines 44 and 46 through an optional video converter 48 to another input of the video switch 42. The video switch output on line 50 is connected to the monitor 20. The PLC 12 which is controlled by the CPU via the data link 26 has an output denoted "CBI SELECT" on line 52 which is connected to a control input of the video switch 42 and to the CBI 14. The video switch 42 is so configured that when the CBI SELECT signal is off the switch will connect the CPU video line 40 to the monitor via line 50, and when the signal is on the switch will instead connect the video line 46 from the CBI 14 to the monitor. Accordingly, when the CBI SELECT signal is on the monitor is able to respond immediately to CBI video signals. The CBI SELECT signal is turned on or off under control of the CPU which in turn is controlled by the keypad 16.

The keypad 16 has a dedicated key for turning the CBI SELECT signal on and off, and effectively toggles between the two conditions. When the CBI SELECT signal is on, pressing the dedicated key will turn it off, and vice versa, so that the control of the monitor is switched back and forth as desired by the single key command. All the other keypad commands effect only that processor, CBI or CPU, which currently has control of the monitor 20. Thus the general or non-dedicated keypad control is switched back and forth between the CBI and the CPU as the monitor control is switched. Both switching functions are accomplished by software in the CPU processor, and response to non-dedicated commands is controlled by software in both processors.

Figure 3:
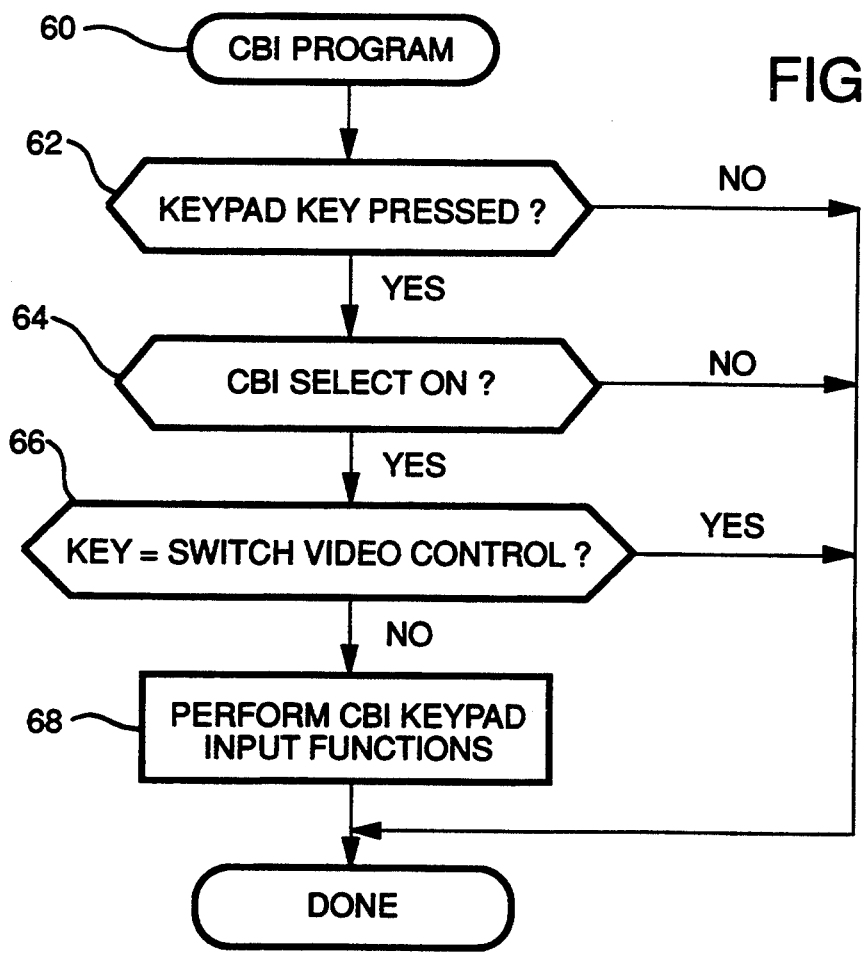
FIGS. 3 and 4 are flow charts representing programs in the processors of FIG. 2 for managing the control of the monitor and the keypad response.

FIG. 3 is a flow chart representing a CBI program structure 60 for CBI control in response to keypad entries other than the dedicated key which is here denoted by the command "Switch Video Control". The program first determines whether a key is pressed, step 62, and if so whether the CBI SELECT signal is on, step 64. If the signal is off the program is done but if it is on the key command is tested, step 66. If the command is Switch Video Control the program is done but if it is a different command the indicated function is performed, step 68. Thus, as long as the CBI SELECT signal is on, the CBI will respond to keypad entries other than the dedicated command for switching control.

Figure 4:
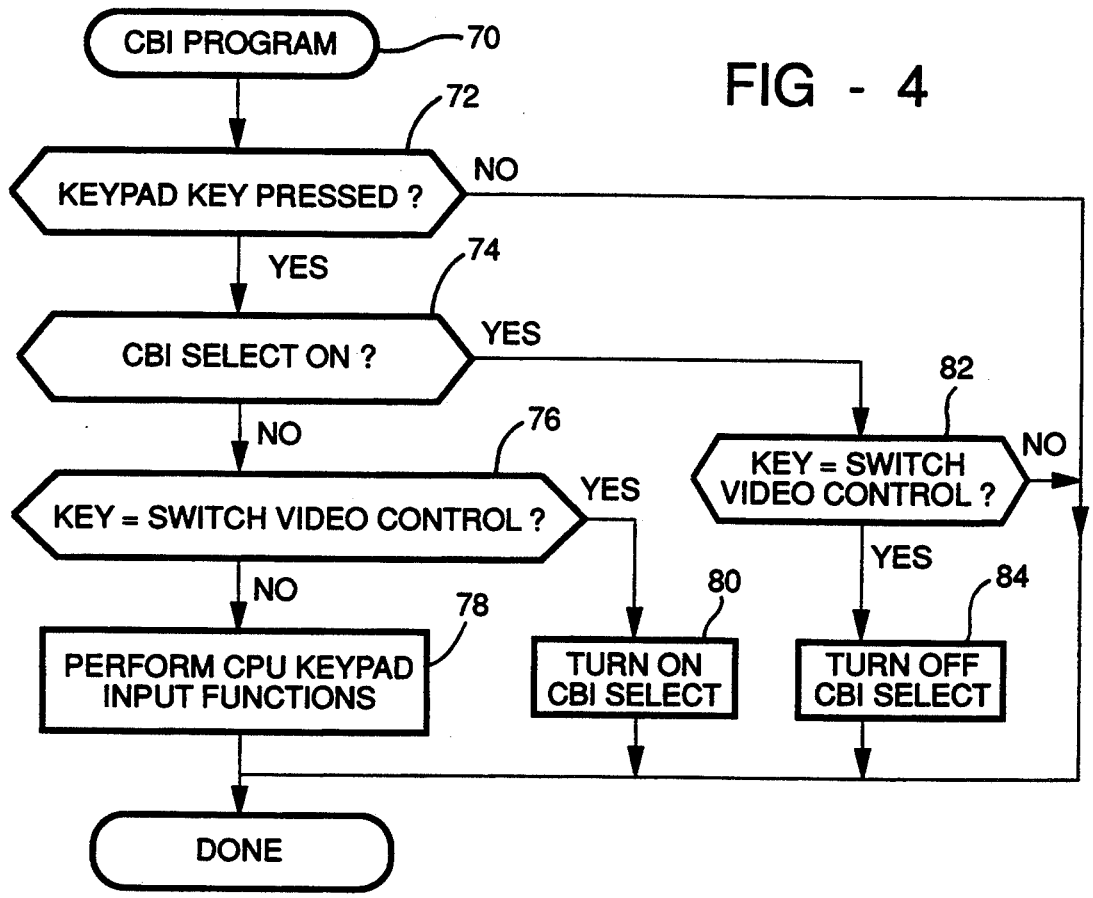

FIG. 4 is a flow chart representing a CPU program 70 structure for switching monitor and keyboard control in response to pressing the dedicated key and for responding to other keypad entries when the CBI SELECT signal is off. If a keypad key is pressed, step 72, and the CBI SELECT signal is off, step 74, and the dedicated key is not pressed, step 76, the CPU will perform the indicated keypad input function, step 78. If however, in step 76 the dedicated key is pressed, the CBI SELECT signal is turned on, step 80, thereby exchanging monitor control and general keypad response from the CPU processor to the CBI processor. In step 74, if the CBI SELECT signal is on, and the dedicated key is pressed, step 82, then the CBI SELECT signal is turned off, step 84.

The circuit of FIG. 2 depicts the video converter 48 and the video switch 42 as separate circuits since they may be constructed that way and the converter may be omitted entirely when the auxiliary processor 14 video signal is compatible with the monitor. However to exemplify the case where such compatibility does not exist, FIG. 5 reveals a video sharing circuit which merges the conversion and switching functions. Specifically, the video sharing circuit designed for the case where the monitor and the CPU video use the TTL format and the CBI processor uses an analog VGA format.

Figure 5:
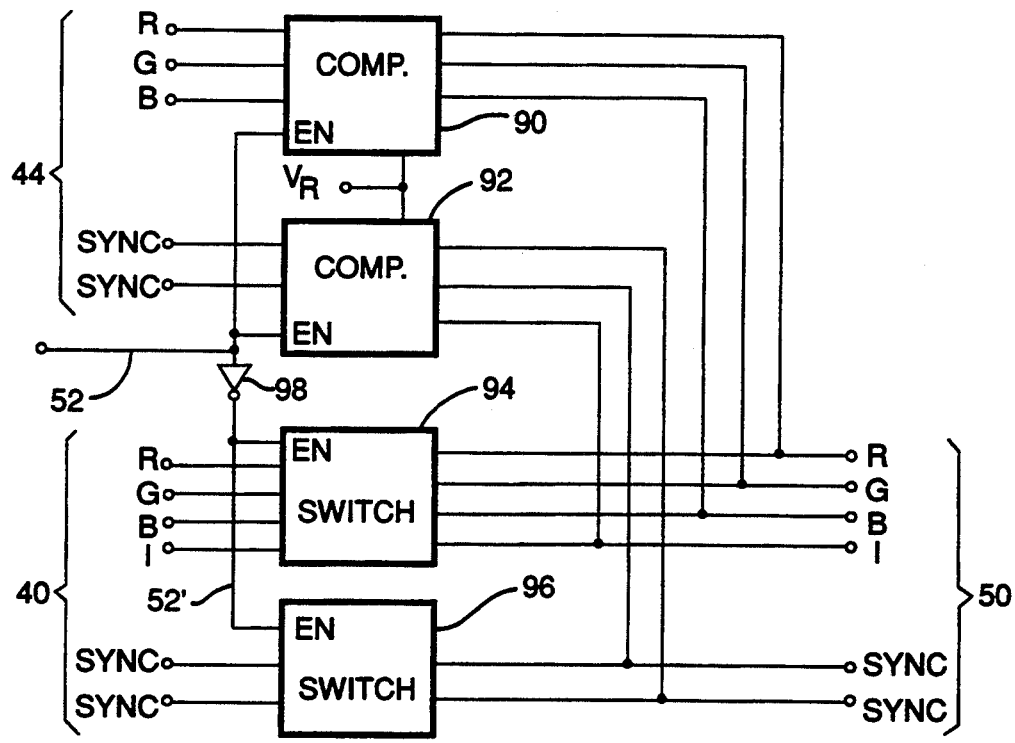
FIG. 5 is a schematic diagram of a video switch and converter used in FIG. 2.

The video sharing circuit of FIG. 5 includes four integrated circuits. Two of the IC's 90 and 92 are quad differential line receivers (such as DS26LS32CN) and comprise an array of comparators referenced to a threshold voltage $V_R$ and having an enable input connected to line 52 which carries the CBI SELECT signal. When that signal is on the comparators are enabled. Analog input signals from line 44 are fed to the first IC 90 and comprise R, G and B signals which vary in voltage over a certain range. Each signal is compared by a comparator to a reference voltage $V_R$ and when the signal is above the threshold a corresponding R, G and/or B output signal is turned on, and is coupled to the video output on line 50. Similarly, sync signals are fed to the second IC 92 and compared to $V_R$ to produce equivalent output sync signals coupled to line 50. In addition, IC 92 produces a constant value intensity signal I which also becomes part of the video output. The other two IC's 94 and 96 are logic circuits acting as switches responding to the voltage applied to enable inputs. The line 52 is connected through an inverter 98 to the enable inputs via line 52', so that when the IC's 90 and 92 are on the IC's 94 and 96 are off, and vice versa. The TTL signals on line 40 are R, G, B, I (intensity) and synch signals which are input to the IC's 94 and 96 and are passed through to the output and coupled to video output line 50 when the CBI SELECT signal is off. Accordingly the output 50 always receives TTL signals and the source alternates between the VGA line 44 and the TTL line 40 according to the state of the CBI SELECT signal on line 52.

It will thus be apparent that the improved monitor and keypad sharing system allows direct access of the keypad to either processor and direct access of either processor to the monitor without the time delays which are inherent in passing the key commands or the CBI video signal through the PLC and CPU. This improved operation is accompanied by simpler requirements for programming the auxiliary processor since a standard keypad command format is used. In addition the system includes rationalization of incompatible video formats.

The embodiments of the invention in which an exclusive property or privilege is claimed are defined as follows:

1. A controller for a balancing machine comprising:
   interface means formed of a keypad, a monitor, and a first processor;
   said first processor being formed of a central processing unit for controlling the operation of the balancing machine and having a first video output for generating a TTL-formatted video signal which is compatible with said monitor;
   a second processor being formed of a computerized balancing instrument for measuring unbalance, determining correction locations and amounts and having a second video output for generating an analog-formulated video signal which is uncompatible with said monitor;
   said keypad being coupled via a first data link to said first and second processors;

a programmable logic controller coupled via a second data link to said first processor and coupled via a third data link to said second processor, said programmable logic controller being controlled by said first processor for generating a select signal in response to a dedicated command from said keypad;

said monitor having a monitor input;

video switch means including a switch output coupled to said monitor input and being responsive to said select signal for selectively coupling one of said first video output of said first processor and said second video output of said second processor to said switch output so as to effect control of a display on said monitor by said first or second processor;

an analog-to-TTL converter interconnected between said second video output of said second processor and said switch output of said video switch means for converting said analog-formatted video signal to a compatible form with said monitor; and said first processor being controlled by said keypad and having direct access to said monitor when said select signal is at a first logic level and said second processor being controlled by said keypad and having direct access to said monitor when said select signal is at a second logic level.

2. A controller for a balancing machine as claimed in claim 1, wherein said programmable logic controller controlled by said first processor is always responsive to said dedicated command from said keypad for changing the control of said monitor from said first or second processor currently in control to said other processor, and wherein only the selected processor responds to other non-dedicated commands from said keypad.

3. A controller for a balancing machine as claimed in claim 1, wherein said analog-to-TTL converter is integrated with said video switch means.

* * * * *